Dec. 19, 1961 M. BIALY 3,013,919
LAMINATED STRAP
Filed April 3, 1958
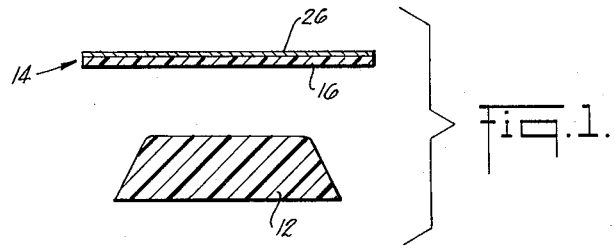
Fig. 1.
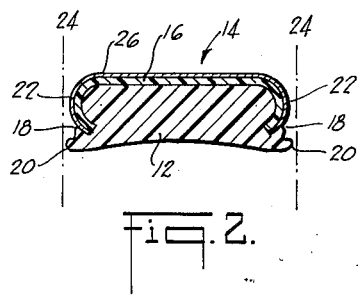
Fig. 2.
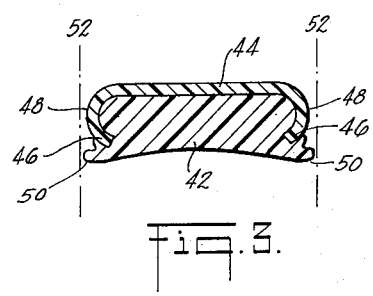
Fig. 3.
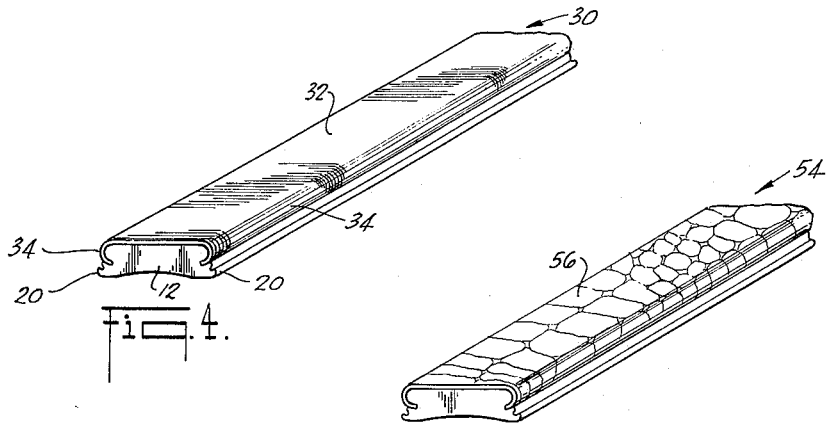
Fig. 4.
Fig. 5.
INVENTOR.
MICHAEL BIALY
BY James and Franklin
ATTORNEYS

United States Patent Office 3,013,919
Patented Dec. 19, 1961

3,013,919
LAMINATED STRAP
Michael Bialy, Brooklyn, N.Y., assignor to Polyform Plastics Corp., New York, N.Y., a corporation of New York
Filed Apr. 3, 1958, Ser. No. 726,184
5 Claims. (Cl. 154—53.6)

This invention relates to belts or straps made of plastics materials.

Straps have been made by extruding plastics materials for use as inexpensive belts, handles for ladies' handbags, ladies' shoestraps, and other such purposes. A soft flexible material for this purpose is plasticized polyvinyl chloride, but when not made too thick, polyethylene is also suitable. In order to improve the appearance of such straps, strips of thin sheet material having a desired finish have been laminated onto the surface of the extruded material. Surfaces of desired color and texture, and even metallized surfaces, have been provided. However, difficulty has arisen because of wear and separation at the edges.

The primary object of the present invention is to generally improve straps or belts of the aforesaid type. A more particular object is to prevent separation of the laminations at the edges of the strap. Another object is to give the strap an improved appearance. Still another object is to protect the surface material against wear at the edges of the strap as the strap is repeatedly run through a buckle or other such component.

To accomplish the foregoing general objects, and other more specific objects which will hereinafter appear, my invention resides in the laminated strap elements and their relation one to another, as are hereinafter more specifically described in the following specification. The specification is accompanied by a drawing, in which:

FIG. 1 shows the base and a laminated cover strip before they are laminated together;

FIG. 2 is a section through the strap after the parts have been secured together;

FIG. 3 is a section similar to FIG. 2, but showing a modification in which the covering strip is not itself laminated;

FIG. 4 is a perspective view of a fragment of a strap made in accordance with FIG. 2; and FIG. 5 is a perspective view of a fragment of a strap made in accordance with FIG. 3.

Referring to the drawing, and more particularly to FIG. 1, the laminated strap is made up of a piece 12 made of a soft flexible plastics material, preferably polyvinyl chloride. The strap further comprises a covering strip 14, at least the bottom 16 of which is a compatible plastics material. In this case the base 12 and part 16 are both polyvinyl chloride. The covering strip 14 is considerably wider than the base 12. Moreover, it is very much thinner, and in FIG. 1 the thickness of the covering strip 14 has been considerably exaggerated in order to show that it is laminated.

The base strip 12 is preferably extruded from a standard extruding machine. The covering strip 14 is preferably formed by slitting wide sheet material. The strip 14 is preferably assembled to the base 12 immediately after extrusion, and while the base is still hot and is still in a comparatively soft plastic condition. The strip is adhered to the base in any desired manner, as by heat causing a direct fusion or welding of the materials, or by means of a solvent or an adhesive, or by any desired combination of these methods, for example, heat accompanied by the application of a thin film of solvent.

In any case, the parts are adhered together under pressure applied by rollers, and these rollers are suitably shaped to turn the edges of the covering strip downward and inward and to embed the same in reverse direction into the side edges of the base strip, as shown at 18, 18 in FIG. 2.

It will also be noted that the extruded base 12 shown in FIG. 1 is wider at the bottom than at the top, and the extra material is used to form beads or edges 20, 20, which protect the covering strip from wear at the sides 22, 22. This is indicated by the vertical broken lines 24, which show the excess width at 20, 20, so that when the strap runs repeatedly through a buckle or the like, there is no direct abrasion against the finished surface of the strap at 22, 22.

The particular form of strap shown in FIGS. 1 and 2 has a metallized appearance. Specifically the covering strip 14 is cut from a laminated sheet having an upper lamination 26 on the lower lamination 16. The upper lamination 26 in the present case is a metallized "Mylar." Mylar is a plastics sheets or film made by the Du Pont Company. It is a polyester film made from polyethylene terephthalate. It is a polymer formed by the condensation reaction between ethylene glycol and terephthalic acid. The laminated metallized sheet 14 may be purchased on the open market, and the method of securing together the laminations 16 and 26 forms no part of the present invention.

Referring now to FIG. 4, the strap 30 has a metallic surface appearance at the top 32 and also around the curved edges 34. The strap gives the appearance of sheet metal with rolled edges, yet the strap is flexible. The rolled edges are protected against abrasion and wear by the bottom edges 20, previously referred to, and at this point the vinyl material of the base is exposed, and may have a contrasting color. The surface 32 may be scored with closely spaced transverse lines, as though constituting a fine mesh chain to account for its unexpected flexibility. These lines may be provided directly in the wide laminated sheet material, as purchased, and from which the covering strip is slit.

It will be understood that the covering strip need not be laminated, and such a modification of the invention is shown in FIGS. 3 and 5. Referring to FIG. 3, the base 42 is laminated to a covering strip 44. The showing in FIG. 1 is applicable if the lamination of the covering strip is disregarded. More specifically, the covering strip is slit from sheet material as before. It is of uniform thickness, and is quite thin compared to the base strip, the thickness being exaggerated in the drawing for clarity. The strip is made of a plastics material which is compatible with and readily adhered to the base material. It has a desired color and surface texture. It is preferably laminated to a base material which is wider at the bottom than at the top, and this is preferably done while the base material is still soft. The edges of the covering strip are turned downward and reversed inward and are embedded in the base material, as shown at 46. The rounded edge portions 48 are protected against wear by the edges 50, which protrude as indicated by the vertical broken lines 52.

Referring to FIG. 5, it will be seen that in the present case, strap 54 has a leather-like surface indicated at 56. Various other surface textures may be provided, such as those suggesting a textile material, as well as those suggesting natural leathers of various kinds. The surface may be "calf" meaning dull, or "patent" meaning glossy.

Plasticized polyvinyl chloride is preferred, but in limited thickness, polyethylene is also usable. The general requirement is that the material be soft and flexible yet withstand wear.

It is believed that the construction of my improved laminated strap, as well as the advantages thereof, will be apparent from the foregoing detailed description. The strap has an improved appearance because of the rounded covered edges. The laminated surface material cannot come loose at the edges because the edges are locked into the base material. The surface at the rounded edges is protected against wear because of the greater width of the base material at the bottom. The strap is economical to manufacture because the base material is inexpensive and is formed by extrusion, and the covering material is added immediately following and substantially as a continuing part of the extrusion operation.

It will be understood that while I have shown and described my invention in a preferred form, changes may be made without departing from the scope of the invention, as sought to be defined in the following claims.

I claim:

1. A flexible laminated strap comprising a base made of a soft flexible plastics material, and a thin flexible covering strip at least the bottom of which is a compatible flexible plastics material, said covering strip initially being somewhat wider and very much thinner than the base strip, and being secured thereto, the edges of said covering strip being turned downward and inward and being embedded into the side edges of the base strip, the desired flexibility of the strap being retained because of the flexibility and thinness of the inturned covering strip, and said base strip being wider at the bottom than at the top, whereby the edges of the covering strip are protected from wear by the edges of the base strip.

2. A flexible laminated strap comprising a base made of a soft flexible polyvinyl chloride, and a thin flexible covering strip at least the bottom of which is a compatible flexible polyvinyl chloride, said covering strip initially being somewhat wider and very much thinner than the base strip, and being secured thereto, the edges of said covering strip being turned downward and inward in reverse direction and being embedded into the side edges of the base strip, the desired flexibility of the strap being retained because of the flexibility and thinness of the inturned covering strip, and said base strip being wider at the bottom than at the top, whereby the edges of the covering strip are protected from wear by the edges of the base strip.

3. A flexible laminated strap comprising a base made of a soft flexible polyethylene, and a thin flexible covering strip at least the bottom of which is a compatible flexible polyethylene, said covering strip initially being somewhat wider and very much thinner than the base strip, and being secured thereto, the edges of said covering strip being turned downward and inward in reverse direction and being embedded into the side edges of the base strip, the desired flexibility of the strap being retained because of the flexibility and thinness of the inturned covering strip, and said base strip being wider at the bottom than at the top, whereby the edges of the covering strip are protected from wear by the edges of the base strip.

4. A flexible laminated strap as defined in claim 1, in which the covering strip is a laminated sheet material the bottom lamination of which is the aforesaid compatible flexible plastics material, and the top lamination of which is a metallized polyester film made of polyethylene terephthalate, whereby the strap is given the appearance of metal with rolled edges.

5. A flexible laminated strap as defined in claim 2, in which the covering strip is a laminated sheet material the bottom lamination of which is the aforesaid polyvinyl chloride, and the top lamination of which is a metallized polyester film made of polyethylene terephthalate, whereby the strap is given the appearance of metal with rolled edges.

References Cited in the file of this patent

UNITED STATES PATENTS

| | | |
|---|---|---|
| 1,985,997 | Keeran | Jan. 1, 1935 |
| 2,203,822 | Hyman | June 11, 1940 |
| 2,401,472 | Franklin | June 4, 1946 |
| 2,422,969 | Johns | June 24, 1947 |
| 2,686,745 | De Matteo | Aug. 17, 1954 |
| 2,702,580 | Bateman | Feb. 22, 1955 |
| 2,789,381 | Belgard | Apr. 23, 1957 |

FOREIGN PATENTS

| | | |
|---|---|---|
| 359,756 | Italy | June 4, 1938 |
| 1,068,241 | France | Feb. 3, 1954 |